(12) United States Patent
Salotto (10) Patent No.: US 11,423,506 B2
(45) Date of Patent: Aug. 23, 2022

(54) VIDEO FRAME TO FRAME DIFFERENCE WATERMARKING WITH DRM METADATA

(71) Applicant: CMT RESEARCH (PTY) LTD, Stellenbosch (ZA)

(72) Inventor: Antony Salotto, Stellenbosch (ZA)

(73) Assignee: CMT Research (PTY) LTD, Stellenbosch (ZA)

( * ) Notice: Subject to any disclaimer, the term of this patent is extended or adjusted under 35 U.S.C. 154(b) by 17 days.

(21) Appl. No.: 17/049,258

(22) PCT Filed: Apr. 18, 2019

(86) PCT No.: PCT/IB2019/053213
§ 371 (c)(1),
(2) Date: Oct. 20, 2020

(87) PCT Pub. No.: WO2019/202539
PCT Pub. Date: Oct. 24, 2019

(65) Prior Publication Data
US 2021/0295462 A1 Sep. 23, 2021

(30) Foreign Application Priority Data
Apr. 20, 2018 (ZA) .................. 2018/02630

(51) Int. Cl.
*G06T 1/00* (2006.01)
*H04N 19/467* (2014.01)

(52) U.S. Cl.
CPC ......... *G06T 1/0085* (2013.01); *H04N 19/467* (2014.11); *G06T 2201/0051* (2013.01); *G06T 2201/0065* (2013.01)

(58) Field of Classification Search
CPC ........... G06T 1/0085; G06T 2201/0051; G06T 2201/0065; H04N 19/467
See application file for complete search history.

(56) References Cited

U.S. PATENT DOCUMENTS

| | | |
|---|---|---|
| 7,197,164 B2 | 3/2007 | Levy |
| 2005/0123169 A1* | 6/2005 | Wendt .................. G06T 1/0064 382/100 |

(Continued)

FOREIGN PATENT DOCUMENTS

| | | |
|---|---|---|
| EP | 1720354 A1 | 11/2006 |
| EP | 1366464 A1 | 4/2011 |

OTHER PUBLICATIONS

International Search Report and Written Opinion of the International Search Authority, dated Aug. 8, 2008, PCT Application No. PCT/IB2009/053213.

*Primary Examiner* — Christopher Wait
(74) *Attorney, Agent, or Firm* — FisherBroyles, LLP (57) ABSTRACT

A digital watermarking system and method for embedding information in and extracting information from content items, such as video signals, are described. In a method for encoding or embedding information in a content item, a content item including a plurality of frames is accessed in which each of a number of elements within the frames is associated with an inter-frame difference measure representing changes in the element between two frames. Information for embedding in the content item is accessed. Symbols of the information are embedded in the content item by manipulating the inter-frame difference measure of a selected element through a number of frames using an algorithm and the information. The information is used by the algorithm to control the manipulation. The manipulated content item is output as a watermarked content item having the information embedded therein.

17 Claims, 4 Drawing Sheets

(56) References Cited

U.S. PATENT DOCUMENTS

2007/0071282 A1    3/2007  Isogai
2008/0273741 A1*  11/2008  Fujii ................. H04N 1/32208
                                                      375/E7.089

* cited by examiner

FIGURE 7

VIDEO FRAME TO FRAME DIFFERENCE WATERMARKING WITH DRM METADATA

CROSS-REFERENCE TO RELATED APPLICATIONS

This application is a U.S. National Application filed under 35 U.S.C. § 371 of international patent application PCT/IB2019/053213, filed on 18 Apr. 2019, titled "DIGITAL WATERMARKING SYSTEM AND METHOD," which claims priority from South African provisional patent application number 2018/02630 filed on 20 Apr. 2018, the entire disclosure of each of which is incorporated by reference herein.

FIELD

This invention relates to a digital watermarking system and method for embedding information in and extracting information from content items, such as video signals.

BACKGROUND

Digital watermarking is a process for modifying physical or electronic media to embed information into the media. The information may be machine readable code and the media may be modified such that the embedded information is imperceptible or nearly imperceptible to an end user, yet may be detected through software implemented detection processes.

Typically, digital watermarking is applied to content items such as images, audio signals, and video signals. However, it may also be applied to other types of media objects, including documents (e.g., through line, word or character shifting), software, multi-dimensional graphics models, and surface textures of objects.

Other forms of digital watermarking use features of how a video signal changes over time to reduce the perceptibility of the watermark, and to improve its robustness against tampering. For example, U.S. Pat. No. 7,197,164B2 discloses a digital watermark embedder which reduces a watermark signal as a function of time varying properties of video such that a watermark that would otherwise be static over frames is selectively reduced to make it imperceptible. The method computes a watermark signal corresponding to locations within a frame, where the watermark signal is mapped to locations in the video frame and is computed based upon attributes of the video within the frame. The method varies the strength of the watermark signal over time. The process of varying the strength includes reducing the strength of the watermark signal to make the digital watermark less perceptible in the video in locations where the video has time varying properties. The method embeds the watermark signal into the video at the locations with varying strength.

In other cases, selective quantization (rounding-off of values) of the colour, brightness, or other features in the frame is used to encode information.

It is generally desirable for the information embedded in the video signal to be as imperceptible to a human consumer as possible and to be robust against manipulations that the video signal can undergo, such as compression, cropping, or distortion. There accordingly remains scope for improvement.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY

In accordance with an aspect of the invention there is provided a computer-implemented method comprising: accessing a content item including a plurality of frames, wherein each of a number of elements within the frames is associated with an inter-frame difference measure representing changes in the element between two frames; accessing information for embedding in the content item; embedding symbols of the information in the content item by manipulating the inter-frame difference measure of a selected element through a number of frames using an algorithm and the information, wherein the information is used by the algorithm to control the manipulation; and outputting the manipulated content item as a watermarked content item having the information embedded therein.

Further features provide for the content item to include a video signal; and for the elements to include one or more of the group of: an object that appears in multiple successive frames; and a brightness measure of a predetermined region of multiple successive frames.

A still further feature provides for the information to include a digital rights management token and error correction coding.

Yet further features provide for the information to be represented by a series of symbols selected from a set of symbols, for the algorithm to include an assignment of a predetermined difference measure parameter to each symbol of the set of symbols; and for the predetermined difference measure parameter to be a comparison of inter-frame difference measure values of a particular sequence of frames.

A further feature provides for manipulating the inter-frame difference measure of the selected element to include: for each symbol of the series of symbols representing the information, selecting the predetermined difference measure parameter assigned to that symbol; and manipulating the selected element in a selected frame of the content item based on the selected predetermined difference measure parameter.

Still further features provide for the steps of manipulating the inter-frame difference measure of the selected element defined immediately above to repeat for each symbol of the series of symbols representing the information; and for one or both of different elements or different frames to be manipulated for different symbols in the series of symbols representing the information.

Even further features provide for manipulating the selected frame of the content item based on the selected predetermined difference measure parameter to include replacing the selected frame with a modified frame in which the difference measure of the selected element in the frame in relation to one or more reference frames approximates the selected predetermined difference measure parameter; and, for the modified frame to be selected from a set of alternative frames which are similar to the selected frame which is to be modified, and for the alternative frames to have been generated such that difference measure values of one or more elements therein relative to difference measure values of the one or more elements in the selected frame to be modified exceed a predetermined threshold.

A further feature provides for the modified frame to be selected from an upsampled version of the content item.

A still further feature provides for the method to include: generating metadata relating to one or more of the selected elements, selected frames and a difference measure function; and, providing access to the metadata for use in decoding the watermarked content item.

In accordance with a further aspect of the invention there is provided a computer-implemented method comprising: accessing a watermarked content item having information embedded therein, wherein the content item includes a plurality of frames and wherein each of a number of elements within the frames is associated with an inter-frame difference measure representing changes in the element between two frames; evaluating the inter-frame difference measure of a selected element through a number of frames using an algorithm; estimating symbols of the information based on the evaluation of the inter-frame difference measure of the selected element; and, outputting the symbols to provide the information.

Further features provide for the information to be represented by a series of symbols, each symbol being selected from a set of symbols; for the algorithm to include an assignment of a predetermined difference measure parameter to each symbol of the set of symbols; and for the predetermined difference measure parameter to be a comparison of inter-frame difference measure values of a particular sequence of frames.

Still further features provide for evaluating the inter-frame difference measure of the selected element to include: determining inter-frame difference measure values of the selected element between selected frames; comparing the difference measure values against predetermined difference measure parameters, each predetermined difference measure parameter being assigned to a symbol of the set of symbols used to represent the information; and for estimating symbols of the information based on the evaluation of the inter-frame difference measure of the selected element to include estimating the symbol based on the comparison.

A yet further feature provides for the inter-frame difference measure to be evaluated for one or both of different elements and different frames to obtain different symbols of the information.

Still further features provide for the method to include accessing metadata relating to one or more of the selected elements, selected frames and a difference measure function used in encoding the watermarked content item, and for evaluating the inter-frame difference measure to use the algorithm and the metadata.

In accordance with a further aspect of the invention there is provided an encoder comprising: a processor and a memory configured to provide computer program instructions to the processor to execute functions of components; a content item accessing component for accessing a content item including a plurality of frames, wherein each of a number of elements within the frames is associated with an inter-frame difference measure representing changes in the element between two frames; an information accessing component for accessing information for embedding in the content item; an embedding component for embedding symbols of the information in the content item by manipulating the inter-frame difference measure of a selected element through a number of frames using an algorithm and the information, wherein the information is used by the algorithm to control the manipulation; and an outputting component for outputting the manipulated content item as a watermarked content item having the information embedded therein.

In accordance with a further aspect of the invention there is provided a decoder comprising: a processor and a memory configured to provide computer program instructions to the processor to execute functions of components; a watermarked content item accessing component for accessing a watermarked content item having information embedded therein, wherein the content item includes a plurality of frames and wherein each of a number of elements within the frames is associated with an inter-frame difference measure representing changes in the element between two frames; an evaluating component for evaluating the inter-frame difference measure of a selected element through a number of frames using an algorithm; an estimating component for estimating symbols of the information based on the evaluation of the inter-frame difference measure of the selected element; and, an outputting component for outputting the symbols to provide the information.

In accordance with a further aspect of the invention there is provided a system including the encoder and decoder as defined above.

In accordance with a further aspect of the invention there is provided a computer program product comprising a computer-readable medium having stored computer-readable program code for performing the steps of: accessing a content item including a plurality of frames, wherein each of a number of elements within the frames is associated with an inter-frame difference measure representing changes in the element between two frames; accessing information for embedding in the content item; embedding symbols of the information in the content item by manipulating the inter-frame difference measure of a selected element through a number of frames using an algorithm and the information, wherein the information is used by the algorithm to control the manipulation; and, outputting the manipulated content item as a watermarked content item having the information embedded therein.

In accordance with a further aspect of the invention there is provided a computer program product comprising a computer-readable medium having stored computer-readable program code for performing the steps of: accessing a watermarked content item having information embedded therein, wherein the content item includes a plurality of frames and wherein each of a number of elements within the frames is associated with an inter-frame difference measure representing changes in the element between two frames; evaluating the inter-frame difference measure of a selected element through a number of frames using an algorithm; estimating symbols of the information based on the evaluation of the inter-frame difference measure of the selected element; and, outputting the symbols to provide the information.

Further features provide for the computer-readable medium to be a non-transitory computer-readable medium and for the computer-readable program code to be executable by a processing circuit.

Embodiments of the invention will now be described, by way of example only, with reference to the accompanying drawings.

DETAILED DESCRIPTION WITH REFERENCE TO THE DRAWINGS

The present disclosure relates to a digital watermarking system and method. In the described system and method, information may be embedded in a content item, such as a video signal, by manipulating an inter-frame difference measure of a selected element through a series of frames. Aspects of the disclosure may utilize selective time-domain quantization (resampling) to encode information in the content item. By maintaining a temporal sampling rate above the threshold for fluid perceived motion (~24 frames per second), the introduction of visual artefacts in the resampled video may be kept to a minimum.

Figure 1:
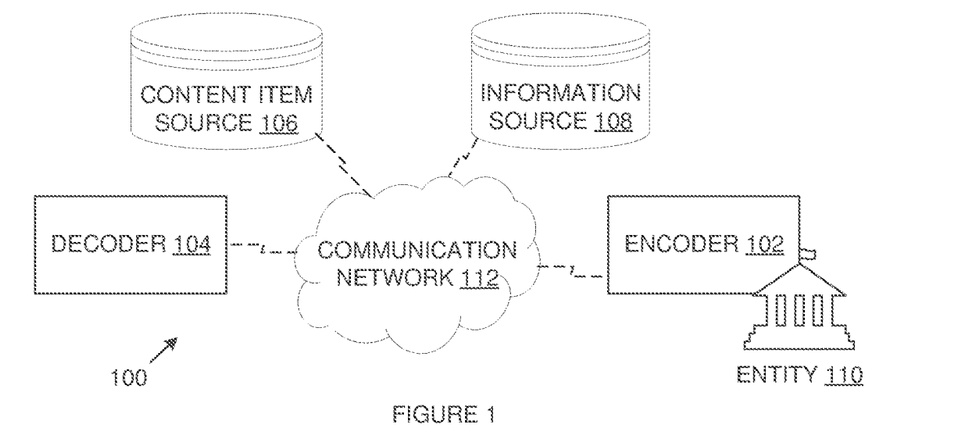
FIG. 1 is a schematic diagram which illustrates an exemplary digital watermarking system.

FIG. 1 is a schematic diagram which illustrates an exemplary digital watermarking system (100). The system may include an encoder (102) and a decoder (104).

The encoder (102) may be provided by one or more hardware or software units. In some cases the encoder may be provided by a computing device. The encoder (102) may have access to a content item source (106) from which the encoder can access original content items for watermarking.

Each content item may include a plurality of frames and a number of elements may be located within the frames. The elements may be specific objects (e.g. a particular person, animal, car etc.), regions of the frame having particular characteristics (such as a particular brightness, colour, etc.) or the like. Each element may be associated with an inter-frame difference measure representing changes in the element from one frame to the next (or between any two frames having that element). For example, in the case of a video signal having multiple scenes, in any given scene, a number of elements will be repeated from one frame to the next at least for portions of the scene (e.g. the same individual may be present in substantial portions of the scene, or particular regions of the scene may have particular characteristics which are similar from one frame to the next). The properties of the element will change from one frame to the next during the scene and by quantifying the amount or degree of change in these properties between selected frames, an inter-frame difference measure may be arrived at.

The encoder may also have access to an information source (108) from which information for embedding into the content items may be accessed. The information may be machine readable code represented by a series or sequence of symbols. For example, the information may be represented in binary (with symbols "0" and "1"), hexadecimal or the like. The information may include a digital rights management token (which may be any suitable identifier usable in identifying a source or authorised holder of the content item and/or detecting unauthorized use of the digital content item).

The encoder (102) may be configured to embed the information into the content item using an algorithm and to output a watermarked content item. The encoder may embed the information by manipulating the inter-frame difference measure of a selected element through a number or series of frames using an algorithm and the information. In some implementations, the encoder (102) may be configured to generate metadata which can be used by the decoder to decode the watermarked content item.

The encoder (102) may be provided by an entity (110) providing a watermarking service. For example, the entity may provide watermarking services to original content item producers or vendors. In some implementations, the entity may provide a digital rights management function. The digital rights management function may be a blockchain-based digital rights management system. In one implementation, for example, the information embedded in content items includes a cryptocurrency private key such that possible subsequent transactions against the private key, and hence infringement of the digital rights associated with the content item, can be detected by monitoring the shared public transaction ledger (e.g. by monitoring the blockchain). Another implementation may for example use so-called 'smart contracts' (e.g. such as an Ethereum smart contract) to embed any secret in the content items which, once revealed, allows or causes some or other transaction to execute.

The decoder (104) may similarly be provided by one or more hardware or software units or, in some cases, by a computing device. The decoder (104) may have access to watermarked content items. In some implementations, the decoder (104) may have access to metadata usable in decoding watermarked content items. Each of a watermarked content item and its corresponding metadata may be accessed by the decoder (104) via separate channels and possibly from separate sources. For example in some implementations, the watermarked content item may be accessed from a content item distribution service while the metadata may be accessed from the entity (110) providing the watermarking service.

The decoder (104) may be configured to decode the watermarked content item to extract the information encoded therein. The decoder may decode the watermarked content item by evaluating the inter-frame difference measure of a selected element through a series of frames and estimating symbols of the information based on the evaluation of the inter-frame difference measure of the selected element. This may include using one or both of the metadata and an algorithm known to the decoder.

Any suitable entity may operate the decoder (104). In some cases, private individuals or groups of individuals may operate the decoder to detect and report infringement of digital rights associated with content items which are accessible via the distribution service. In a blockchain-based digital rights management system, for example, the private individuals may report infringement by transacting against the private key extracted from the watermarked content item.

The encoder (102), decoder (104), content item source (106) and information source (108) may be in data communication with each other via a suitable communication network (112). In some cases, communication between respective devices or entities on the communication network may be secured (e.g. using TLS, SSL, etc.). In some cases, aspects of the communication network may be private (for example, the encoder and information source may communicate on a private communication network which is accessible to only these devices).

The system (100) described above may implement a digital watermarking method. Encoding operations of an exemplary digital watermarking method are illustrated in the flow diagram of FIG. 2. The described method may be implemented by an encoder (102).

Figure 2:
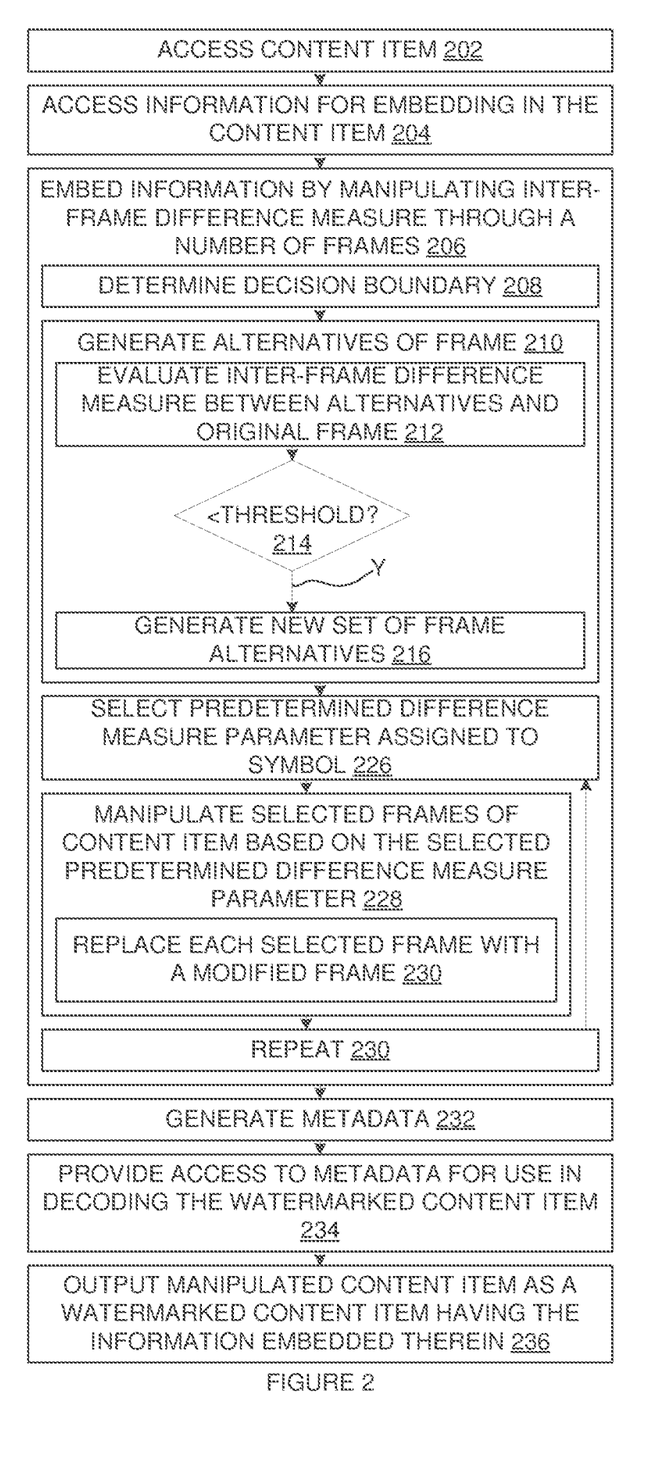
FIG. 2 is a flow diagram which illustrates encoding operations of an exemplary digital watermarking method.

The method may include accessing (202) a content item. The content item may be accessed from the content item source. As mentioned, the content item may include a plurality of frames and each of a number of elements within the frames may be associated with an inter-frame difference measure representing changes in the element between two frames. The frames between which the inter-frame difference measure value is measured may be selectable (e.g. adjacent frames, frames in the same neighbourhood, such as frames relating to the same scene, and the like). The content item may include a video signal.

In the case of the content item including a video signal, an unsampled, continuous-time version of the video signal (a version of the video signal before any sampling or quantization) may be represented as $v(x, y, t)$, where $0 \leq x < X_{max}$, $0 \leq y < Y_{max}$, $0 \leq t < T_{max}$, define the dimensions and length (in time) of the video signal. Sampling and recording the video signal may produce a recorded video signal which may be represented as $v_o(m, n,)=v(mX_o, nY_o, T_o)$. The recorded video signal $v_o$ (hereafter the "original video signal", as it is from the perspective of the watermarking procedure) may have been spatially sampled with uniform horizontal increments $X_o$ and uniform vertical increments $Y_o$. Also, the original video signal may include a finite number of discrete frames uniformly sampled $T_o$ seconds apart. $T_o$ is assumed to be small enough to create the illusion of smooth continuous motion in the original video signal to the average human observer (i.e. $T_o$ is typically smaller than 42 ms). A particular frame in this original video signal (including all horizontal and vertical pixels at that moment in time), is denoted $v_o(p_o)$.

The method may include accessing (204) information for embedding in the content item. The information may be accessed from the information source. The information may be digital information. As mentioned, the information may include a digital rights management token and optionally error correction coding (for implementing any suitable scheme for error detection and correction). The information may be represented by or as a series of symbols selected from a set of symbols. For example, the information may be expressed in the base-2 numeral system or binary numeral system, which uses only two symbols in the set: typically 0 (zero) and 1 (one). In other implementations, other expressions may be used (e.g. hexadecimal, which has 16 symbols). In some implementations, the digital rights management token may include a cryptocurrency private key used in a blockchain-based digital rights management system, a secret configured for use in a smart contract detection mechanism or the like.

The method may include embedding (206) symbols of the information in the content item by manipulating the inter-frame difference measure of a selected element through a number of frames, using an algorithm and the information, for output as a watermarked content item. The information may be used by the algorithm to control the manipulation (e.g. to determine or inform how to manipulate the frames). In the case of the content item including a video signal, the watermarked video signal may be denoted $v_w$, with a particular frame of the watermarked video signal being denoted $v_w(p_o)$.

Embedding (206) the information in the content item may include determining (208) a decision boundary (or a set of decision boundaries) which are capable of distinguishing between different versions of a frame of the original video signal, $v_o(p_o, s)$. In some implementations, the decision boundary used to distinguish between different versions of a frame may use a difference measure function, D.

The decision boundaries or set of decision boundaries may be optimised. In a so-called 'partially blind' implementation, described in greater detail below, knowledge of this decision boundary may be shared with the decoder to enable/assist decoding. The set of all such decision boundaries (and their corresponding frame numbers, {p}) for each frame to which watermarking is applied, may constitute metadata that may be an output of the embedding process and an input to the decoding process.

Decision boundaries representable in a form that can be provided to the decoder as metadata may be selected. In particular, transfer of the metadata should be practical (i.e. not too slow or require too much storage). The metadata should also be able to be passed to the decoder without compromising the security of the watermarking system.

In the case of a video signal, embedding (206) the information in the content item may include, for each frame index $p_o$ of the video signal (or for each of a number of selected frames, which may follow a particular sequence), generating (210) a number of perceptually similar versions of the frame $v_o(p_o)$, or "alternatives" of the frame, that could act as substitutes for it in the watermarked video signal. The alternatives of the frame may be perceptually similar in that without close examination they would appear to be the same to a consumer of the video signal. The different versions of $v_o(p_o)$ may be denoted $v(p_o, s)$, where s is the symbol that is to be represented by the alternative frame. The set of alternative frames may include the original frame. For example, one additional, perceptually similar frame may be generated and used together with the original frame as a set of alternatives from which to choose, based on the symbol to be encoded. In the case of information for embedding being represented in binary, the number of new versions or alternatives of each frame generated may be 1, with the original frame $v_o(p_o)$, and the newly generated, alternative, frame forming the set of two alternative versions $\{v(p_o, 0), v(p_o, 1)\}$, where $v(p_o, 0)=v_o(p_o)$.

The encoder may store a file or other data structure defining which frames are to be manipulated and which frames are to be used as references for each of the frames to be manipulated.

For efficiency of the embedding process, the different versions of a frame may be generated by a method selected to provide significant computer-detectable differences between at least some of the different versions. However, it may not be necessary for the process to produce a suitable set of alternatives for each frame, since error-correction techniques can be used to account for unmarkable frames. Generating alternatives of a single frame may include performing motion interpolation on interstitial frames generated, for example, by upsampling the video signal.

In some implementations, the process of generating (210) alternatives of a single frame and decision boundaries between them may be iterated. This may be required if the method used to generate the alternatives has a relatively low chance of generating sufficiently perceptually similar, or sufficiently distinguishable alternatives of each frame. This process could be a trial-and-error-based process, or it may be part of an optimisation function that aims to optimize properties like imperceptibility or watermark robustness (distinguishability of the alternatives).

The process of generating (210) alternatives of a single frame may include evaluating (212) the inter-frame difference measure between each of the alternatives and the original frame. If (214) the difference measure falls below a predetermined threshold, indicating that the different versions generated are not sufficiently distinguishable to provide the watermark decoding performance (decoding error probability, robustness to noise, compression, or colour transformation, etc.), the method may include generating (216) a new set of frame alternatives for that original frame. If (214) the difference measure is above the predetermined threshold, the alternatives may be suitable and may be used as the alternatives in the encoding procedure.

Generating the new set of alternatives may include amplifying the relevant difference measure in order to achieve desired values for watermark decoding performance. Amplifying the difference measure may include altering the newly generated frames to exaggerate existing, but small, differences between the different versions of the frame. This may have the effect of scaling the difference measure for each version away from the existing decision boundary. In some implementations, amplifying the difference measure may include identifying in-frame locations of existing small differences between the versions as good candidates for placing additional distortions or artefacts in each frame in order to achieve the desired values for watermark decoding performance. The additional distortions or artefacts may have little or no relation to the differences between the originally generated frame variants, thereby introducing arbitrary new decision boundaries for the decoder to use to distinguish frame versions. The method may include modifying the identified in-frame locations to place the additional distortions or artefacts.

For example, in some embodiments, generating two versions of each frame of the original video may include upsampling the video to twice its original frame rate, using motion interpolation, and then taking each even frame of the upsampled video, $\{v_1(2), v_1(4), v_1(6), \ldots\}$ to be an alternate version of the odd frame $\{v_1(1), v_1(3), v_1(5), \ldots\}$ preceding it. This may result in some pairs of alternatives having only slight differences that would make it difficult for the decoder to distinguish between them, and cause a significant chance of decoder error (for example, for frames where there is little motion in the scene). For such pairs, the encoder may find the locations where there are weak differences between the two versions, and lighten the corresponding pixels of the one version, while darkening the corresponding pixels of the other version, thereby inducing a difference in pixel brightness between the two versions that is substantial enough to be detected reliably by the decoder, more so than the differences due to the upsampling alone. Upsampling is described in greater detail below with reference to FIG. 3.

The alternative frames may thus be generated such that difference measure values of one or more elements therein relative to difference measure values of the one or more elements in the selected frame to be modified exceed the predetermined threshold.

Once alternatives for each frame (and metadata, if required) have been generated, the information for embedding (i.e. the watermark payload) may be used to selectively include frames into the watermarked output. This can be done by encoding the embedding information into a sequence of symbols (using error correction and/or other encoding techniques), assigning each symbol, $s_o$, to a corresponding frame index, $p_o$, and outputting $v_w(p_o)=v(p_o, s_o)$.

As mentioned, in some implementations, the decision boundary used to distinguish between different versions of a frame may use a difference measure function, D. The difference measure function D may, for example, be chosen to measure the total brightness, colour, etc. between selected regions in the two frames. As an alternative example, the difference measure function D could be chosen to measure the relative distance that objects move between the two frames. The information may be used by the algorithm to control the manipulation. As will be explained, frames may thus be selected so that frame pairs $v_w(p)$ and $v_w(p+1)$ of the ultimate watermarked content item maximize or minimize the inter-frame difference measure, $D\{v_w(p), v_w(p+1)\}$.

The algorithm may include an assignment of a predetermined difference measure parameter to each symbol of the set of symbols used to represent the information. In other words, each symbol in the set of symbols may be represented by a predetermined difference measure parameter. The predetermined difference measure parameter may be a comparison of inter-frame difference measure values of a particular sequence of frames (e.g. of two overlapping pairs of successive frames or any other suitable selection of frames). For example, in the case of a video signal, an inter-frame difference measure value of a watermarked video signal $v_w$ may be denoted $D\{v_w(p), v_w(p+1)\}$ and an inter-frame difference parameter may be a comparison of the difference measure value of three successive frames (e.g. $v_w(p), v_w(p+1)$ and $v_w(p+2)$). Of course, other sequences of frames may be used in defining the predetermined difference measure parameters. One exemplary assignment of symbols (s) to predetermined difference measure parameters may be:

for $D\{v_w(p),v_w(p+1)\}>D\{v_w(p+1),v_w(p+2)\}, s=$ '0' and for $D\{v_w(p),v_w(p+1)\}\leq D\{v_w(p+1),v_w(p+2)\}, s=$ '1', where $s\in['0', '1']$ (i.e. binary symbols).

Manipulating the inter-frame difference measure of the selected element may include, for each symbol of the series of symbols representing the information, selecting (226) the predetermined difference measure parameter assigned to that symbol and manipulating (228) the selected element in selected frames of the content item based on the selected predetermined difference measure parameter. One or both of different elements or different frames may be manipulated for different symbols in the series of symbols representing the information. The selection (226) and manipulation (228) operations may thus repeat for each symbol in the series of symbols representing the information, albeit in relation to different elements and/or frames. For example, in some implementations, different selected frames (e.g. every second frame) in a sequence of frames may be manipulated based on the predetermined difference measure parameters which map to the symbols being encoded.

Manipulating (228) the selected element in selected frames of the content item based on the selected predetermined difference measure parameter may include replacing (230) each selected frame with a modified frame in which the difference measure value of the selected element in the frame in relation to one or more reference frames approximates the selected predetermined difference measure parameter. The predetermined difference measure parameter may define or specify the reference frames relative to the selected frame.

For example, and with reference to the above described algorithm, should a symbol '1' need to be encoded, a selected frame $v_w(p+1)$ may be modified such that the criterion $D\{v_w(p), v_w(p+1)\} \leq D\{v_w(p+1), v_w(p+2)\}$ is satisfied. That is, the selected element present in frames $v_w(p)$, $v_w(p+1)$ and $v_w(p+2)$ may be modified in frame $v_w(p+1)$ such that the difference measure value associated with this particular frame ($v_w(p+1)$) as compared to the preceding frame ($v_w(p)$) is less than or equal to the difference measure value associated with this particular frame ($v_w(p+1)$) and the succeeding frame ($v_w(p+2)$). As will be explained in greater detail below, the modified frame may be selected from an upsampled version of the original content item.

The operations of selecting (226) the predetermined difference measure and manipulating (228) selected frames of the content item based on the selected predetermined difference measure may repeat (230) for each symbol in the series of symbols representing the information.

The method may include generating (232) metadata relating to one or more of the selected elements, selected frames and a difference measure function (or other decision boundary) and providing access (234) to the metadata for use in decoding the watermarked content item. Access may be provided to the decoder (104) via a suitable communication channel (e.g. over the internet). Providing access (234) to the metadata may include storing the metadata in a secure database from which the decoder can access it upon proper authentication.

In some implementations, metadata may include complete, or nearly complete, and/or downsampled versions of each alternative version of each frame. In this case, the decoder merely has to select the closest match between a frame of the watermarked video and the known alternatives of that frame in order to decode the encoded symbol.

In other implementations, metadata may be generated by recording the positions, structures, and pixel values of a small number of very small regions of each frame where there are differences between some or all of the versions of that frame. Since number and size of the regions is small, they may require only a small amount of storage space and transfer bandwidth to the decoder. The sampled values may also be too sparse to be useful as a copy of the original video signal, $v_o(p)$.

Figure 3:
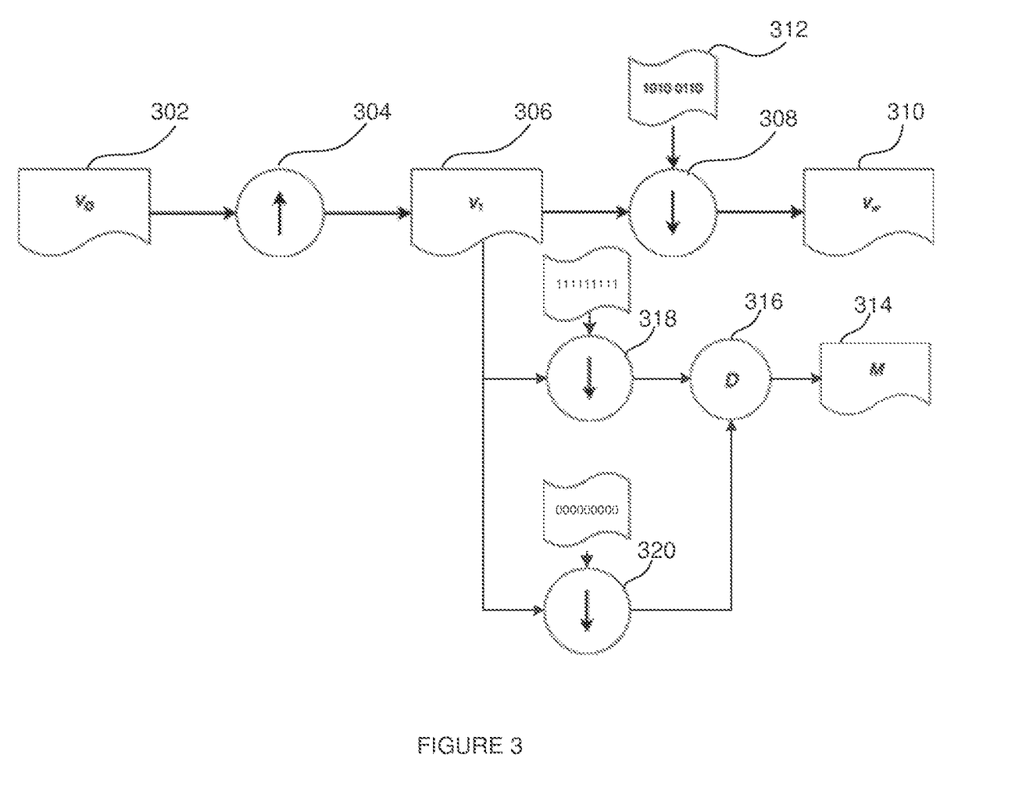
FIG. 3 is a schematic diagram which illustrates an exemplary digital watermarking method in which modified frames are selected from an upsampled version of the content item.

One example of generating metadata is described in greater detail below with reference to FIG. 3.

It is anticipated that in some implementations, the decoder may be unable to decode the watermarked video signal $v_w(p)$ without knowledge of the metadata. The metadata may thus act as a security key that prevents unauthorised decoding of the watermarked content item. Additionally, the encoder may be able to determine from each frame a number of different valid decision boundaries (for example, multiple sampling points in x, y space where the pixel values of the frame differ between alternative frame versions). Some subsets of these decision boundaries may be sufficient for successful watermark decoding. In this case, multiple versions of metadata may be composed from different subsets of decision boundaries for each frame, resulting in different valid "decoding keys" for the watermarked versions of same video.

When one metadata version is known to a potential attacker, that metadata may enable her to generate a modified version of $v_w(p)$, where, for a randomly chosen half of the decision boundaries, the frame is modified in such a way that it guarantees that the decoder will make the wrong decision. This can easily render the watermark unreadable using that particular metadata version. However, where multiple metadata versions where generated by the encoder, using disjoint sets of decision boundaries, the frames of the attacked video may not have been sufficiently modified in the decision regions of other metadata versions not known to the attacker, so that the watermark is still readable using one of those metadata versions.

The method may include outputting (236) the manipulated content item as a watermarked content item having the information embedded therein. Outputting (236) the manipulated content item as a watermarked content item may include storing the watermarked content item in a distribution database from where it may be distributed to authorised users via, for example, a communication network.

As mentioned above, in some implementations, modified frames may be selected from an upsampled version of the original content item. FIG. 3 is a schematic diagram which illustrates an exemplary digital watermarking method in which modified frames are selected from an upsampled version of the content item. The method describes one possible implementation of the manipulating (206) and associated operations described above with reference to FIG. 2.

The original video signal $v_o$ (302) may be upsampled (304) to a sampling period $T_\uparrow$ such that $T_\uparrow < T_o$ to produce an upsampled video signal $v_\uparrow$ (306). For example, the upsampled video signal $v_\uparrow$ could have double the frame rate of the original video signal $v_o$, such that $T_\uparrow = 0.5 \cdot T_o$. The upsampling may be done in such a way that the frames of the upsampled video signal $v_\uparrow$ are as close as possible an approximation of the continuous-time version of the video signal v. Mathematically, $v_\uparrow(m, n, p_\uparrow) = \hat{v}(mX_o, nY_o, p_\uparrow T_o/2)$, where $\hat{v}$ is a close approximation of the continuous-time version of the video signal v.

For example, in the special case where $T_\uparrow = 0.5 \cdot T_o$ (double frame rate), $v_\uparrow$ will have exactly twice as many frames as the original video signal $v_o$. Half of the frames in the upsampled video signal $v_\uparrow$ will be identical to those in $v_o$, and half will be "interstitial" frames that are an interpolation between their neighbouring frames, that best approximate a frame sampled from the continuous-time version of the video signal v.

As a further example, the interstitial frames could be generated by performing motion interpolation between the neighbouring ($v_o(m, n, p_o)$, or equivalently $v_o(p_o)$) frames. In this implementation, the neighbouring frames are analysed to best identify elements (e.g. objects or regions) that have moved from one frame to the next, positioning them in intermediate positions in the interstitial frame, and averaging the colour and brightness of the remaining frame. Motion interpolation may produce a good approximation of the corresponding frames in the continuous-time version of the video signal. In some implementations, a difference measure value between the interstitial frames and neighbouring original frames may be evaluated. If the difference measure value is below a predetermined threshold, the interstitial frame may be modified, manipulated or regenerated to increase the difference measure value (e.g. as described above).

The upsampled video signal $v_\uparrow$ (306) may be downsampled (308) in terms of frame rate to produce a watermarked video signal $v_w$ (310). This may include outputting a signal sampled at the original sampling period $T_o$, but in general the watermarked signal (which approximates the original signal, i.e. $v_w(m, n, p_w) = \hat{v}(mX_o, nY_o, p_w T_w)$) may be sampled at any frame period $T_w > T_\uparrow$.

Downsampling (308) does not select frames uniformly from $v_\uparrow$. Instead, frames are selected so that frame pairs $v_w(p)$ and $v_w(p+1)$ (or other frame groupings) maximize or minimize the inter-frame difference measure, $D\{v_w(p), v_w(p+1)\}$.

By selectively downsampling, the difference measure can be used to select frames such that they encode digital information (312). Selective downsampling may use the algorithm mentioned above to minimize or maximize the inter-frame difference measure associated with successive frames.

Consider for example a case where 2× upsampling is performed, such that $T_\uparrow = 0.5 \cdot T_o$ (i.e. double frame rate). This produces an upsampled signal $v_\uparrow = \{v_o(0), v_i(0), v_o(1), v_i(1), \ldots\}$, where $v_o(\cdot)$ are the frames of the original video signal, and $v_i(\cdot)$ are the interstitial frames produced by motion interpolation between the frames of $v_o$.

In one exemplary implementation, downsampling (308) for watermarking may include selecting the first frame of the watermarked signal to be the same as the first frame of the recorded signal ($v_w(0) = v_o(0)$). The second frame of the watermarked ($v_w(1)$) signal may be selected from the first interstitial frame (($v_w(1) = v_i(0)$), which would produce a small inter-frame difference ($D\{v_w(0), v_w(1)\}$), or the second interstitial frame (($v_w(1) = v_i(1)$), which would produce a large inter-frame difference. The frame selection uses the algorithm and is made based on the information symbol that is to be encoded into the video signal.

If the exemplary algorithm described above is to be used, and if an information symbol '1' is to be encoded, then the first interstitial frame may be selected (i.e. $v_w(1) = v_i(0)$) so that the inter-frame difference measure value between the first two frames ($D\{v_w(0), v_w(1)\}$) is small. The third frame may be selected to be synchronised with the original video signal (i.e. $v_w(2) = v_o(2)$) meaning that the inter-frame difference measure of these two frames ($D\{v_w(1), v_w(2)\}$) is large and the criterion $D\{v_w(0), v_w(1)\} \leq D\{v_w(1), v_w(2)\}$, is thus satisfied and a symbol '1' encoded. The fourth frame $v_w(3)$ can again be chosen to satisfy some inter-frame difference requirement to encode the appropriate symbol.

The downsampling frame selection may repeat for each and every symbol in the series of symbols making up the information that is to be encoded.

The resulting downsampled signal, which is the watermarked video signal, has the same number of frames and average frame rate as the recorded, unwatermarked signal. However, the "frame sampling jitter" introduced into the watermarked video signal has the effect of encoding digital information in the video signal. The visual perceptibility of jitter may optionally be reduced by "whitening" the embedded data by selecting a sequence of binary '0' and '1' symbols that have statistical properties that are similar to a random sequence of binary '0' and '1' symbols.

Under the assumption that the sampling period $T_W$ is smaller than the threshold for fluid motion, and if V is a good approximation of the original continuous-time video signal v, it is unlikely that sampling jitter will be perceptible to an ordinary consumer of the video signal. Consequently, the difference between uniform temporal sampling (the original video) and normalized non-uniform, or jittered, temporal sampling (the watermarked video) is imperceptible. Even in cases where V is a rough approximation of v, a high frame rate may allow many upsampling artefacts to remain unnoticed.

In general, compressibility of a signal is highly dependent on the entropy of the signal. Many existing watermarking techniques increase the entropy of the signal, by adding unpredictable spatial- or transform-domain information to individual frames. In the described method, however, the entropy of v, $v_o$, and $v_w$ are effectively identical, since $v_o$ and $v_w$ are just uniform and non-uniform sampled signals (respectively) of v. As long as both signals satisfy the Nyquist criterion for sampling, and the upsampled signal $v_\uparrow$ is a reasonable approximation of v, the equal-entropy assumption holds. Consequently, this method retains the compressibility of the original unwatermarked video signal. For the same reason, the watermarked video signal is also robust against compression attacks, where further signal compression is used in an attempt to remove imperceptible information.

With reference to the example of a video signal, the difference measure function $D\{\cdot\}$ is independent of the information in v, and the frames in $v_w$ are chosen to maximize or minimize $D\{\cdot\}$ between successive frames in order to encode information. In this general scenario, which may be termed "blind watermark extraction", the decoder requires no prior information about v or $v_o$ in order to estimate the encoded information; $D\{\cdot\}$ is simply calculated for successive frames, and its relative values are used to estimate the embedded symbols.

In some implementations, it may be feasible to share metadata (314) on v or $v_o$ with the decoder. The metadata (314) may be made available to the decoder in order to enable, or assist with, distinguishing between the different versions of each frame, and thereby determine which symbol was embedded. For example, it may be possible to share information about spatial regions in specific frames where the inter-frame difference is particularly pronounced. Such metadata may improve the performance of the watermarking scheme, since it reduces the chance of extraction errors. Partially blind watermark extraction requires shared knowledge of the $v_o$ metadata. This data may be shared over a separate channel in order to make extraction possible.

In one example implementation, generating the metadata (314) may include comparing (316), for each of the selected frames that will be modified, the different or alternative versions (318, 320) of that frame that encode each of the possible symbols that are used. Each of the selected frames may for example have a '0' version and a '1' version. This may include generating one video signal having frames which are selected in downsampling (318) to represent a sequence of '1' symbols and another video signal having frames which are selected in downsampling (320) to represent a sequence of '0' symbols. Comparing (316) the possible versions of the selected frames may include computing the chosen difference measures between the frames. Comparing (316) the frames may include determining any number and kind of decision boundaries, based on any metric that can be used to distinguish between the different versions of each frame. The set of all such "computed differences" or decision boundaries may be output by the encoder as the decoder-assisting (or decoder-enabling) metadata (314). In some implementations, comparing (316) the different or alternative versions (318, 320) of a frame may be effected by comparing consecutive frames of the upsampled video signal.

Figure 4:
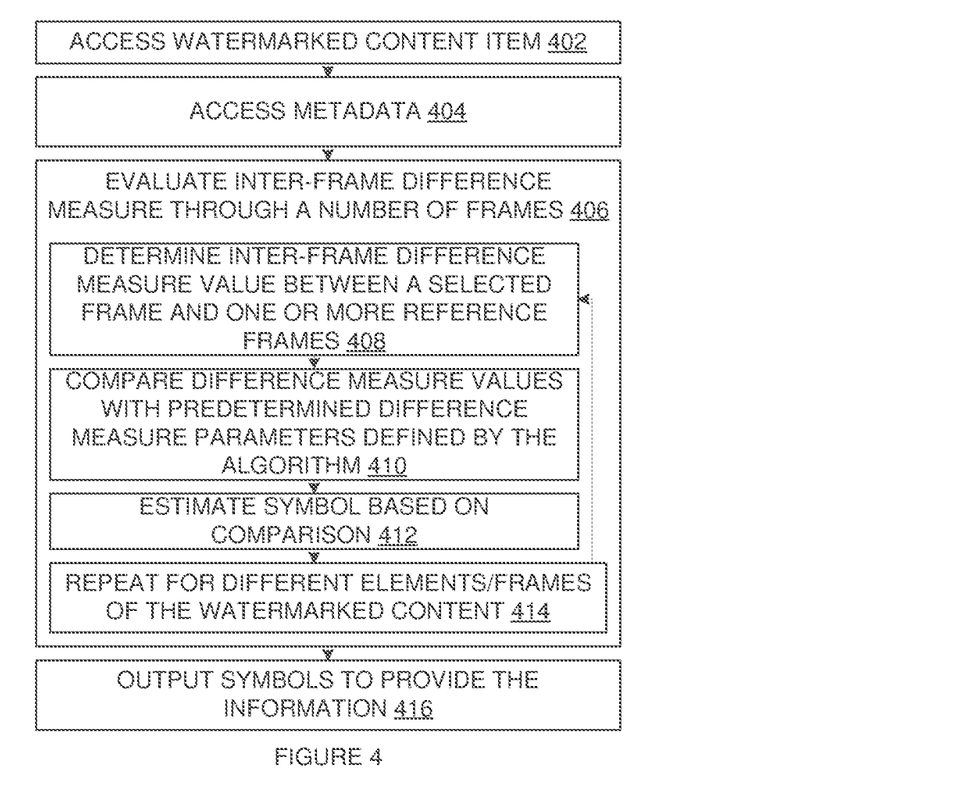
FIG. 4 is a flow diagram which illustrates decoding operations of an exemplary digital watermarking method.

Decoding operations of an exemplary digital watermarking method are illustrated in the flow diagram of FIG. 4. The described method may be implemented by a decoder (104).

The method may include accessing (402) a watermarked content item having information embedded therein. The content item may include a plurality of frames and each of a number of elements within the frames may be associated with an inter-frame difference measure representing changes in the element between two frames. The content item may include a video signal.

In some implementations, the method may include accessing (404) metadata relating to one or more of the selected elements, selected frames and a difference measure function used in encoding the watermarked content item.

The method may include accessing a file or other data structure defining which frames have been manipulated (and in turn which frames should be evaluated) and which frames are to be used as references for each of the frames having been manipulated. In some implementations, this information may be obtained from metadata.

The method may include evaluating (406) the inter-frame difference measure of a selected element through a number of frames using an algorithm. As mentioned above, the algorithm may include an assignment of a predetermined difference measure parameter to each symbol of a set of symbols used to represent the information. The predetermined difference measure parameter may for example be a comparison of inter-frame difference measure values of a particular sequence of frames.

Evaluating (406) the inter-frame difference measure of the selected element may include determining (408) inter-frame difference measure values of the selected element between selected frames (e.g. between a particular frame and one or more reference frames). For example, the inter-frame difference measure value of the second frame of the watermarked content item may be calculated with reference to the preceding and succeeding frames respectively (i.e. $D\{v_w(0), v_w(1)\}$ and $D\{v_w(1), v_w(2)\}$). Evaluating the inter-frame difference measure may use the algorithm and optionally the metadata.

The inter-frame difference measure may be evaluated for one or both of different elements and different frames to obtain different symbols of the information.

The difference measure values may be compared (410) against predetermined difference measure parameters defined by the algorithm and assigned to respective symbols of the set of symbols used to represent the information. One exemplary difference measure parameter may for example be that the particular frame and its immediately preceding frame have a difference measure value which is less than or equal to the difference measure value of the selected frame and its immediately succeeding frame. As described above, such a parameter may be assigned by the algorithm to a symbol '1' in the binary set of symbols.

The method may include estimating (412) the symbol of the information based on the comparison. Estimating the symbol may include using the algorithm. For example, if the particular frame and its immediately preceding frame have a difference measure value which is less than or equal to the difference measure value of the selected or the particular frame and its immediately succeeding frame, a symbol '1' may be selected. Otherwise, if the particular frame and its immediately preceding frame have a difference measure value which is greater than the difference measure value of the particular frame and its immediately succeeding frame, a symbol '0' may be selected. It should be appreciated that different references could be defined for a particular frame (e.g. $p_o+5$ and $p_o-5$, and the like).

Operations (408 to 412) may be repeated (414) for different elements and/or frames of the watermarked content item so as to extract all of the symbols in the sequence of symbols representing the information.

Decoding may thus include calculating the inter-frame difference measure $D\{\cdot\}$ between particular (e.g. successive) frames and, depending on the value, making a decision as to whether the frame difference represents a binary '0' or '1' (or even some more fine-grained selection from a larger symbol set).

The method may include outputting (416) the symbols to provide the information. In some implementations, error detection may be performed before outputting the symbols representing the information. Outputting the symbols to provide the information may include converting the symbols to human-readable information and outputting the human-readable information via a display or other output means.

As mentioned above, in some implementations, manipulated frames may be generated through an upsample-downsample procedure. As the originally-occurring inter-frame differences in $v_t$ may not always allow for a downsampling choice that reliably encodes a '0' or '1', the extraction operations may result in a bit error. Shannon's theory of information coding implies that, as long as these exceptions happen irregularly (<<50%), information embedding remains viable as long as the video is long enough. In some implementations, the information may include error correcting codes and the method may include using the error correcting codes to evaluate the validity of the symbols extracted from the watermarked content item.

The information may further include a digital rights management token. The digital rights management token may be a cryptocurrency private key and the method may include using the digital rights management token in the digital rights management facility.

Figure 5:
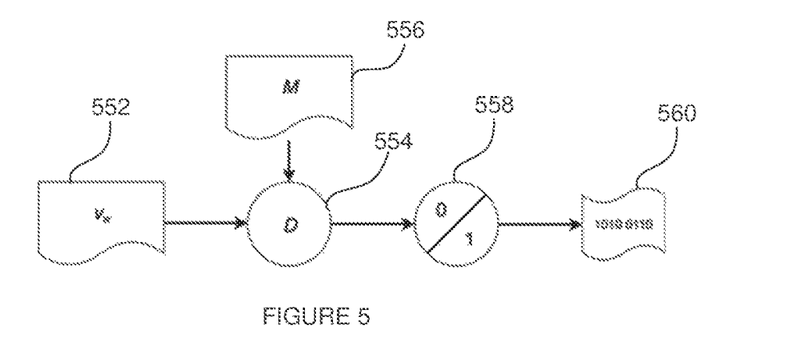
FIG. 5 is a schematic diagram which illustrates decoding operations of an exemplary digital watermarking method in which metadata is used.

FIG. 5 is a schematic diagram which illustrates exemplary decoding operations of a digital watermarking method in which metadata is used by a frame difference calculator of the decoder to estimate the information symbols.

The watermarked content item including the watermarked video signal v (552) is provided to a frame difference calculator (554) which uses the metadata (556) to calculate the frame difference measure values of successive frames of the watermarked video signal.

A symbol estimator (in this case being a bit estimator) (558) estimates the symbols of the information encoded into the watermarked video signal using the algorithm.

This may include retrieving a set of decision boundaries for that frame from the metadata and using this set of decision boundaries to decide which of the alternative versions of $v_o(p_o)$, $v(p_o, s)$, most closely resemble $v_w(p_o)$. The decoded symbol value, s, is then the symbol value known from the metadata to correspond to that particular frame alternative. Once all the symbols are gathered, they can be reconstructed into the embedded watermark information by applying the appropriate error correction scheme used for embedding.

This differs from the blind decoding system, where a subset of the frames in $v_w(p)$ is used for encoding by selection, while the rest are fixed in order to serve as references against which inter-frame differences can be calculated. The partially blind case uses the metadata as its reference, which means that more frames may be available for encoding. The blind case may also rely to some extent on the ability of the encoder to generate alternatives of the "encoding" frames in such a way that it is possible to consistently modulate some difference metric between consecutive encoding and "reference" frames by selection of frame alternatives–"consistent" in the sense that the same difference metric can be calculated for each frame pair, and enough variance can be introduced in that metric from frame to frame by the encoder. This encoding must of course be able to be decoded by the decoder. Motion-interpolation and weighted consecutive frame averaging seem to generally have this property.

The partially-blind decoding implementation has no such requirement on the modulation technique, and the structure and parameters of the decision boundary may be capable of variation between frames to the extent required, as this information is provided to the decoder.

No metadata is strictly required by the blind system. However, blind decoding may be made more reliable by the optional addition of metadata during decoding. This metadata may, for example, act as a filter that, when applied to the watermarked video, boosts the inter-frame difference signal in the places where it is least noisy, and suppress it in the places where it is most noisy.

Additionally, the blind and partially blind approaches may be hybridized so that in the absence of metadata the decoder uses inter-frame differences to output embedded information, but when decoder metadata is available, the decoder uses the decision boundaries therein to more accurately tell which frame alternatives were selected by watermark embedding.

The symbol estimator may then output the series of symbols representing the information (560).

Figure 6:
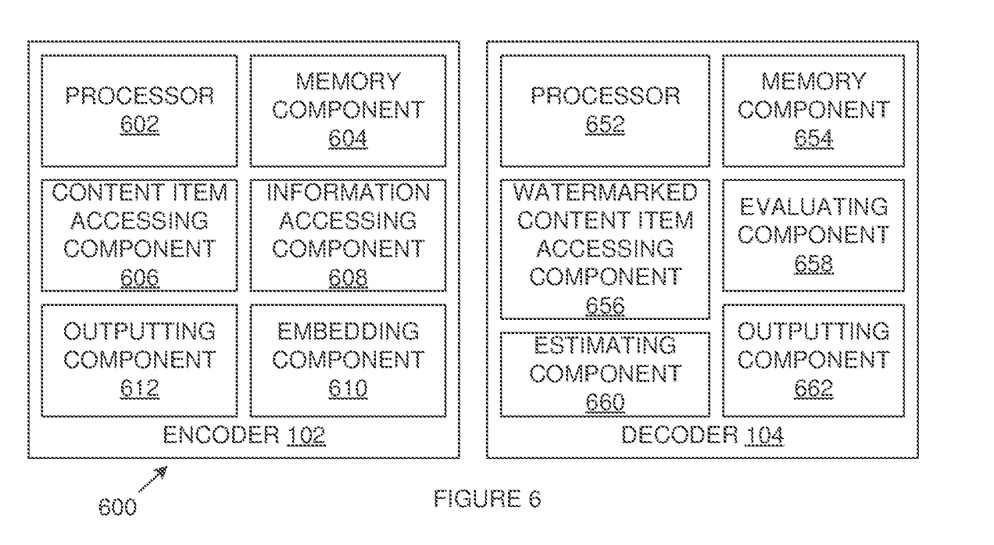
FIG. 6 is a block diagram which illustrates exemplary components which may be provided by a digital watermarking system.

Various components may be provided for implementing the digital watermarking method described above with reference to FIGS. 2 to 5. FIG. 6 is a block diagram which illustrates exemplary components which may be provided by a digital watermarking system (600). The system may include an encoder (102) and a decoder (104).

The encoder (102) may include a processor (602) for executing the functions of components described below, which may be provided by hardware or by software units executing on the encoder (102). The software units may be stored in a memory component (604) and instructions may be provided to the processor (602) to carry out the functionality of the described components.

The encoder (102) may include a content item accessing component (606) arranged to access a content item including a plurality of frames. Each of a number of elements within the frames may be associated with an inter-frame difference measure representing changes in the element between two frames (e.g. from one frame to the next).

The encoder (102) may include an information accessing component (608) arranged to access information for embedding in the content item.

The encoder (102) may include an embedding component (610) arranged to embed the information in the content item by manipulating the inter-frame difference measure of a selected element through a number of frames using an algorithm and the information. The information may be used by the algorithm to control the manipulation.

The encoder (102) may include an outputting component (612) arranged to output the manipulated content item as a watermarked content item having the information embedded therein.

The decoder (104) may include a processor (652) for executing the functions of components described below, which may be provided by hardware or by software units executing on the decoder (104). The software units may be stored in a memory component (654) and instructions may be provided to the processor (652) to carry out the functionality of the described components.

The decoder (104) may include a watermarked content item accessing component (656) arranged to access a watermarked content item having information embedded therein. The content item may include a plurality of frames and each of a number of elements within the frames may be associated with an inter-frame difference measure representing changes in the element between two frames (e.g. from one frame to the next).

The decoder (104) may include an evaluating component (658) arranged to evaluate the inter-frame difference measure of a selected element through a number of frames using an algorithm.

The decoder (104) may include an estimating component (660) arranged to estimate symbols of the information based on the evaluation of the inter-frame difference measure of the selected element.

The decoder (104) may include an outputting component (662) arranged to output the symbols to provide the information.

The system and method described herein provide a method for embedding information in a content item. An original content item for encoding may be accessed. For each frame or for a subset of frames in the original content item, and for a number of optimization iterations (which may be one or more), perceptually similar alternatives of the frame may be generated. The alternatives may be generated to be distinguishable to a computing device, from each other and/or the original frame. Differences that distinguish the alternative versions of the frame from one another may be detected and a symbol may be assigned to each distinguishable version. At least a subset of the distinguishing features may be saved in association with their corresponding symbols as metadata for use by the partially blind decoder. Optionally this operation may be evaluated to determine whether or not an acceptable perceptually similar, yet sufficiently technically distinguishable set of alternatives for the frame in question were produced. If not, the operation may be repeated to obtain a different set of alternatives. Once these operations have been repeated for each frame of the content item (or for as many frames as may be required), the decision boundaries and their associated symbol mappings may be gathered and compiled into metadata. Information for embedding may then be accessed and symbols thereof may be used to determine which alternative version of each original frame is included in the watermarked content item. Access to the metadata may be provided for use in decoding the watermarked content item and the watermarked content item may be output for distribution.

For decoding, a potentially watermarked content item and optionally metadata may be accessed. For each or a subset of frames in the content item, a corresponding set of decision boundaries may be identified in the metadata. The frame may be compared to those decision boundaries to determine which version of the frame is closest to the one being decoded. The corresponding symbol may be assigned to the frame. This may repeat for each frame of the content item. The sequence of symbols may be gathered and used to reconstruct the information.

It should be appreciated that aspects of the present disclosure may provide decoding ranging from fully "blind" extraction of the watermark (i.e. without any supporting metadata) through to fully "non-blind" extraction of the watermark (e.g. where the watermarked video is compared frame-by-frame to the original, unwatermarked video, or frame-by-frame to the individual (undamaged) watermarked videos that were issued). In between there may be a number of "partially blind" approaches, where the decoder has access to some information on what the original frames looked like (i.e. to the metadata).

Figure 7:
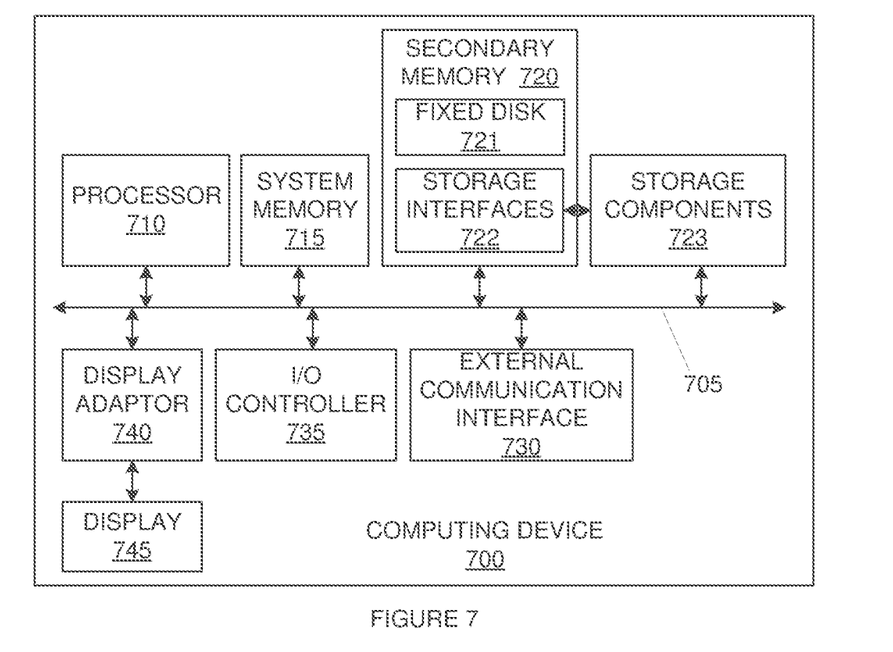
FIG. 7 illustrates an example of a computing device in which various aspects of the disclosure may be implemented.

FIG. 7 illustrates an example of a computing device (700) in which various aspects of the disclosure may be implemented. The computing device (700) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The video and other signals referred to herein may be non-transitory video signals and may be stored in a suitable transitory computer-readable medium. The video signals may thus be termed video media, video media items or the like.

The computing device (700) may be suitable for storing and executing computer program code. The various participants and elements in the previously described system diagrams may use any suitable number of subsystems or components of the computing device (700) to facilitate the functions described herein. The computing device (700) may include subsystems or components interconnected via a communication infrastructure (705) (for example, a communications bus, a network, etc.). The computing device (700) may include one or more processors (710) and at least one memory component in the form of computer-readable media. The one or more processors (710) may include one or more of: CPUs, graphical processing units (GPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (700) may be distributed over a number of physical locations (e.g. in a distributed, cluster or cloud-based computing configuration) and appropriate software units may be arranged to manage and/or process data on behalf of remote devices.

The memory components may include system memory (715), which may include read only memory (ROM) and random-access memory (RAM). A basic input/output system (BIOS) may be stored in ROM. System software may be stored in the system memory (715) including operating system software. The memory components may also include secondary memory (720). The secondary memory (720) may include a fixed disk (721), such as a hard disk drive, and, optionally, one or more storage interfaces (722) for interfacing with storage components (723), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (700) may include an external communications interface (730) for operation of the computing device (700) in a networked environment enabling transfer of data between multiple computing devices (700) and/or the Internet. Data transferred via the external communications interface (730) may be in the form of signals, which may be electronic, electromagnetic, optical, radio, or other types of signal. The external communications interface (730) may enable communication of data between the computing device (700) and other computing devices including servers and external storage facilities. Web services may be accessible by and/or from the computing device (700) via the communications interface (730).

The external communications interface (730) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry.

The computer-readable media in the form of the various memory components may provide storage of computer-executable instructions, data structures, program modules, software units and other data. A computer program product may be provided by a computer-readable medium having stored computer-readable program code executable by the central processor (710). A computer program product may be provided by a non-transient computer-readable medium, or may be provided via a signal or other transient means via the communications interface (730).

Interconnection via the communication infrastructure (705) allows the one or more processors (710) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (700) either directly or via an I/O controller (735). One or more displays (745) (which may be touch-sensitive displays) may be coupled to or integrally formed with the computing device (700) via a display or video adapter (740).

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™, C++, or Perl™ using, for example, conventional or object-oriented techniques. The computer program code may be stored as a series of instructions, or commands on a non-transitory computer-readable medium, such as a random-access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification unless the contents requires otherwise the word 'comprise' or variations such as 'comprises' or 'comprising' will be understood to imply the inclusion of a stated integer or group of integers but not the exclusion of any other integer or group of integers.

What is claimed is:

1. A computer-implemented method comprising:
    accessing a content item including a plurality of frames, wherein each of a number of elements within the frames is associated with an inter-frame difference measure representing changes in the element between two frames;
    accessing information for embedding in the content item;
    embedding symbols of the information in the content item by manipulating the inter-frame difference measure of a selected element through a number of frames using an algorithm and the information, wherein the information is used by the algorithm to control the manipulation;
    generating metadata relating to one or more of the selected elements, selected frames, and a difference measure function;
    outputting the manipulated content item as a watermarked content item having the information embedded therein; and
    providing access to the metadata for use in decoding the watermarked content item.

2. The method as claimed in claim 1, wherein the content item includes a video signal, and wherein the elements include one or more of the group of: an object that appears in multiple successive frames; and a brightness measure of a predetermined region of multiple successive frames.

3. The method as claimed in claim 1, wherein the information includes a digital rights management token.

4. The method as claimed in claim 1, wherein the information is represented by a series of symbols selected from a set of symbols, and wherein the algorithm includes an assignment of a predetermined difference measure parameter to each symbol of the set of symbols.

5. The method as claimed in claim 1, wherein manipulating the inter-frame difference measure of the selected element includes:
    for each symbol of the series of symbols representing the information, selecting a predetermined difference measure parameter assigned to that symbol; and
    manipulating the selected element in a selected frame of the content item based on the selected predetermined difference measure parameter.

6. The method as claimed in claim 5, wherein the steps of manipulating the inter-frame difference measure of the selected element repeat for each symbol of the series of symbols representing the information.

7. The method as claimed in claim 5, wherein one or both of different elements or different frames are manipulated for different symbols in the series of symbols representing the information.

8. The method as claimed in claim 5, wherein manipulating the selected frame of the content item based on the selected predetermined difference measure parameter includes replacing the selected frame with a modified frame in which the difference measure of the selected element in the frame in relation to one or more reference frames approximates the selected predetermined difference measure parameter.

9. The method as claimed in claim 8, wherein the modified frame is selected from a set of alternative frames which are similar to the selected frame which is to be modified, and wherein the alternative frames have been generated such that difference measure values of one or more elements therein relative to difference measure values of the one or more elements in the selected frame to be modified exceed a predetermined threshold.

10. The method as claimed in claim 4, wherein the predetermined difference measure parameter is a comparison of inter-frame difference measure values of a particular sequence of frames.

11. The method as claimed in claim 8, wherein the modified frame is selected from an upsampled version of the content item.

12. A computer-implemented method comprising:
    accessing a watermarked content item having information embedded therein, wherein the content item includes a plurality of frames and wherein each of a number of elements within the frames is associated with an inter-frame difference measure representing changes in the element between two frames;
    accessing metadata referring to one or more of selected elements, selected frames, and a difference measure function used in encoding the watermarked content item;
    evaluating the inter-frame difference measure of a selected element through a number of frames using an algorithm and the metadata;
    estimating symbols of the information based on the evaluation of the inter-frame difference measure of the selected element; and
    outputting the symbols to provide the information.

13. The method as claimed in claim 12, wherein the information is represented by a series of symbols, each symbol being selected from a set of symbols, and wherein the algorithm includes an assignment of a predetermined difference measure parameter to each symbol of the set of symbols.

14. The method as claimed in claim 12, wherein evaluating the inter-frame difference measure of the selected element includes:
    determining inter-frame difference measure values of the selected element between selected frames; and,
    comparing the difference measure values against predetermined difference measure parameters, each predetermined difference measure parameter being assigned to a symbol of a set of symbols used to represent the information;
    and wherein estimating symbols of the information based on the evaluation of the inter-frame difference measure of the selected element includes estimating the symbol based on the comparison.

15. The method as claimed in claim 14, wherein the inter-frame difference measure is evaluated for one or both of different elements and different frames to obtain different symbols of the information.

16. The method as claimed in claim 13, wherein the predetermined difference measure parameter is a comparison of inter-frame difference measure values of a particular sequence of frames.

17. A computer-implemented method comprising:
    accessing a content item including a plurality of frames, wherein each of a number of elements within the frames is associated with an inter-frame difference measure representing changes in the element between two frames;
    accessing information for embedding in the content item;
    embedding symbols of the information in the content item by manipulating the inter-frame difference measure of a selected element through a number of frames using an algorithm and the information, wherein the information is used by the algorithm to control the manipulation, and wherein manipulating the inter-frame difference measure of the selected element includes:
    for each symbol of the series of symbols representing the information, selecting a predetermined difference measure parameter assigned to that symbol; and
    manipulating the selected element in a selected frame of the content item based on the selected predetermined difference measure parameter, including replacing the selected frame with a modified frame in which the difference measure of the selected element in the frame in relation to one or more reference frames approximates the selected predetermined difference measure parameter, and wherein the modified frame is selected from an upsampled version of the content item; and
    outputting the manipulated content item as a watermarked content item having the information embedded therein.

* * * * *